(12) United States Patent
Palmer et al.

(10) Patent No.: US 7,844,839 B2
(45) Date of Patent: Nov. 30, 2010

(54) DISTRIBUTION OF NETWORK COMMUNICATIONS BASED ON SERVER POWER CONSUMPTION

(75) Inventors: Matthew Palmer, Menlo Park, CA (US); Sanjay Beri, Redwood City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 983 days.

(21) Appl. No.: 11/625,629

(22) Filed: Jan. 22, 2007

(65) Prior Publication Data

US 2008/0141048 A1    Jun. 12, 2008

Related U.S. Application Data

(60) Provisional application No. 60/868,970, filed on Dec. 7, 2006.

(51) Int. Cl.
*G06F 1/00* (2006.01)
*G06F 1/26* (2006.01)
*G06F 1/32* (2006.01)
*G06F 15/16* (2006.01)
*G06F 9/455* (2006.01)

(52) U.S. Cl. .......................... 713/300; 713/320; 718/1; 718/100; 718/102; 718/103; 718/104; 718/105; 709/201; 709/203

(58) Field of Classification Search ...................... 718/1, 718/100, 102, 103, 104, 105; 713/300, 320; 709/201, 203
See application file for complete search history.

(56) References Cited

U.S. PATENT DOCUMENTS

| | | | | |
|---|---|---|---|---|
| 7,127,625 | B2* | 10/2006 | Farkas et al. | 713/320 |
| 7,600,135 | B2* | 10/2009 | Jones | 713/300 |
| 2002/0046268 | A1* | 4/2002 | Leong et al. | 709/223 |
| 2003/0065497 | A1* | 4/2003 | Rhoads | 703/18 |
| 2003/0196126 | A1 | 10/2003 | Fung | |
| 2003/0217090 | A1* | 11/2003 | Chauvel et al. | 709/102 |
| 2005/0027952 | A1* | 2/2005 | Mayo et al. | 711/158 |
| 2005/0055590 | A1* | 3/2005 | Farkas et al. | 713/320 |
| 2005/0060590 | A1* | 3/2005 | Bradley et al. | 713/320 |

OTHER PUBLICATIONS

European Search Report dated Dec. 21, 2007, for corresponding European Application No. 07254041.2, 8 pgs.
Rusu et al., "Energy-Efficient Real-Time Heterogeneous Server Clusters," Proceedings of the 12th IEEE Real-Time and Embedded Technology and Applications Symposium, San Jose, California, USA, Apr. 4, 2006, 10 pgs.
Chase et al., "Balance of Power: Energy Management for Server Clusters," Workshop on Hot Topics in Operating Systems, May 2001, 6 pgs.
Merkel et al., "Balancing Power Consumption in Multiprocessor Systems," EuroSys 2006, Leuven, Belgium, Apr. 18-21, 2006, 11 pgs.
Bianchini et al., "Power and Energy Management for Server Systems," IEEE Computer, Nov. 2004, 11 pgs.

* cited by examiner

*Primary Examiner*—Mark Connolly
(74) *Attorney, Agent, or Firm*—Shumaker & Sieffert, P.A.

(57) ABSTRACT

A network device is described that load-balances network traffic among a set of network servers based on electrical power consumption of the network servers. The network device may measure electrical power consumption in a variety of ways, and may generate and maintain a power consumption profile for each of the network server. The power consumption profile may describe the respective server power consumption in increasing granularity. For instance, each power consumption profile may specify electrical power consumption according to watts consumed by a server per average transaction, watts consumed per transaction for a specific type of software application, watts consumed per transaction for a software application for individual network resources, and so on. Furthermore, the profiles may be maintained for individual servers or aggregated for groups or sequences of servers.

38 Claims, 7 Drawing Sheets

| SERVER ID | Level 1 (Watts/time period) | Level 2 (Watts/network application/time period) | | | Level 3 (Watts/target resource/application/time period) | | |
|---|---|---|---|---|---|---|---|
| | General | HTTP | FTP | DNS | HTTP FILE 1 | HTTP FILE 2 | FTP FILE 3 |
| 1 | 0.1 | 0.11 | 0.09 | 0.12 | 0.13 | 0.08 | 0.08 |
| 2 | 0.2 | 0.22 | 0.15 | 0.25 | 0.24 | 0.21 | 0.16 |
| 3 | 0.09 | 0.24 | 0.05 | 0.08 | 0.25 | 0.23 | 0.16 |
| ... | | | | | | | |

DISTRIBUTION OF NETWORK COMMUNICATIONS BASED ON SERVER POWER CONSUMPTION

This application claims the benefit of U.S. Provisional Application No. 60/868,970, filed Dec. 7, 2006, the entire content of which is incorporated herein by reference.

TECHNICAL FIELD

The invention relates to computer networks, and particularly to load-balancing in computer networks.

BACKGROUND

A data center is a specialized facility that houses network servers provides data services. In its most simple form, a data center may consist of a single facility that hosts all of the infrastructure equipment. A more sophisticated data center can be an organization spread throughout the world with subscriber support equipment located in various physical hosting facilities. Data centers allow enterprises to provide a number of different types of services, including e-commerce services to customers; extranets and secure VPNs to employees and customers; firewall protection and Network Address Translation (NAT) services, web caching as well as many others. These services can all be provided at an off-site facility in the data center without requiring the enterprise to maintain the facility itself.

Each of the network servers within a data center requires electrical power to operate. Moreover, a data center that houses network servers must include a heating, ventilating, and air conditioning (HVAC) system to regulate the temperature of the network servers. The HVAC system also requires electrical power to operate. Typically, a regional electricity grid supplies this electrical power. However, under certain circumstances, the data center may be unable to receive sufficient electrical power from this electricity grid. For example, the data center's connection to the electricity grid may be severed or brownout conditions may occur. To avoid a shutdown of the data center when the data center is unable to receive sufficient electrical power from the electricity grid, the data center may include one or more local electrical generators that supply electrical power to the data center when the data center is unable to receive sufficient electrical power from the electricity grid.

Local electrical generators may be expensive to purchase, install, and operate. Minimization or optimization of the power consumption of the network servers may reduce the costs associated with the purchase, installation, and operation such electrical generators. Furthermore, minimization or optimization of the power consumption of the network servers may reduce the costs associated with the purchase of electrical power from the electricity grid.

SUMMARY

In general, the invention is directed to techniques of load-balancing network traffic among a set of network servers based on electrical power consumption of the network servers. Example embodiments of the invention may define rates of electrical power consumption in a plurality of ways. For instance, the embodiments may define rates of electrical power consumption according to watts consumed by a server per average transaction, watts consumed by a server per transaction for a specific type of software application, watts consumed by a server per request to a specific network resource (e.g., by way of a particular universal resource locator (URL)), and so on. Furthermore, embodiments of the invention may define rates of electrical power consumption for groups or sequences of servers.

The techniques make use of one or more intermediate load-balancers, which are network devices that distribute network traffic among the plurality of network servers. By application of the techniques described herein, a system that distributes network traffic among a set of network servers based on rates of electrical power consumption may consumes less overall power as compared to a similar system that distributes network traffic among network servers without regard to electrical power consumption. Because such a system may consume less electrical power, overall costs related to the purchase and/or generation of electrical power may be reduced. Furthermore, the techniques described herein may allow an administrator to more easily anticipate and manage rates of power consumption.

In one embodiment, a method comprises receiving, with an intermediate network device, a network communication from a computer network. The intermediate network device is located between a client device and a plurality of servers. The method also comprises determining a network application associated with the network communication. In addition, the method comprises identifying a set of the plurality of servers able to process network communication. In addition, the method comprises selecting a server in the set of servers as a function of a power consumption rate for each of the servers, wherein the power consumption rate specifies an amount of power consumed by the respective server when processing network communications associated with the network application. Furthermore, the method comprises forwarding the network communication to the selected server.

In another embodiment, a network device located on a computer network between a client device and a plurality of servers. The network device comprises an interface to receive a network communication from the computer network. The network device also comprises a server selection module to determine a network application associated with the network communication, to identify a set of the plurality of servers able to process the network communication and, to select a server in the set of servers as a function of a power consumption rate for each of the servers, wherein the power consumption rate specifies an amount of power consumed by the respective server when processing network communications associated with the network application, and to forward the network communication to the selected server.

In another embodiment, a system comprises a client device, a plurality of network servers, a network load-balancing device, and a network to facilitate communication between the servers and the network load-balancing device. The network device comprises an interface to receive a network communication from the client device. The network device also comprises a server selection module to determine a network application associated with the network communication, to identify a set of the plurality of servers able to process the network communication and, to select a server in the set of servers as a function of a power consumption rate for each of the servers, wherein the power consumption rate specifies an amount of power consumed by the respective server when processing network communications associated with the network application, and to forward the network communication to the selected server.

In another embodiment, a computer-readable medium comprises instructions. The instructions cause a programmable processor to receive, with an intermediate network device, a network communication from a computer network.

The intermediate network device is located between a client device and a plurality of servers. The medium also includes instructions that cause the processor to determine a network application associated with the network communication and to identify a set of the plurality of servers able to process the network communication. In addition, the instructions cause the processor to select a server in the set of network servers as a function of a power consumption as a power consumption rate for each of the servers. The power consumption rate specifies an amount of power consumed by the respective server when processing network communications associated with the network application. The instructions also cause the processor to forward the network communication to the selected server.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
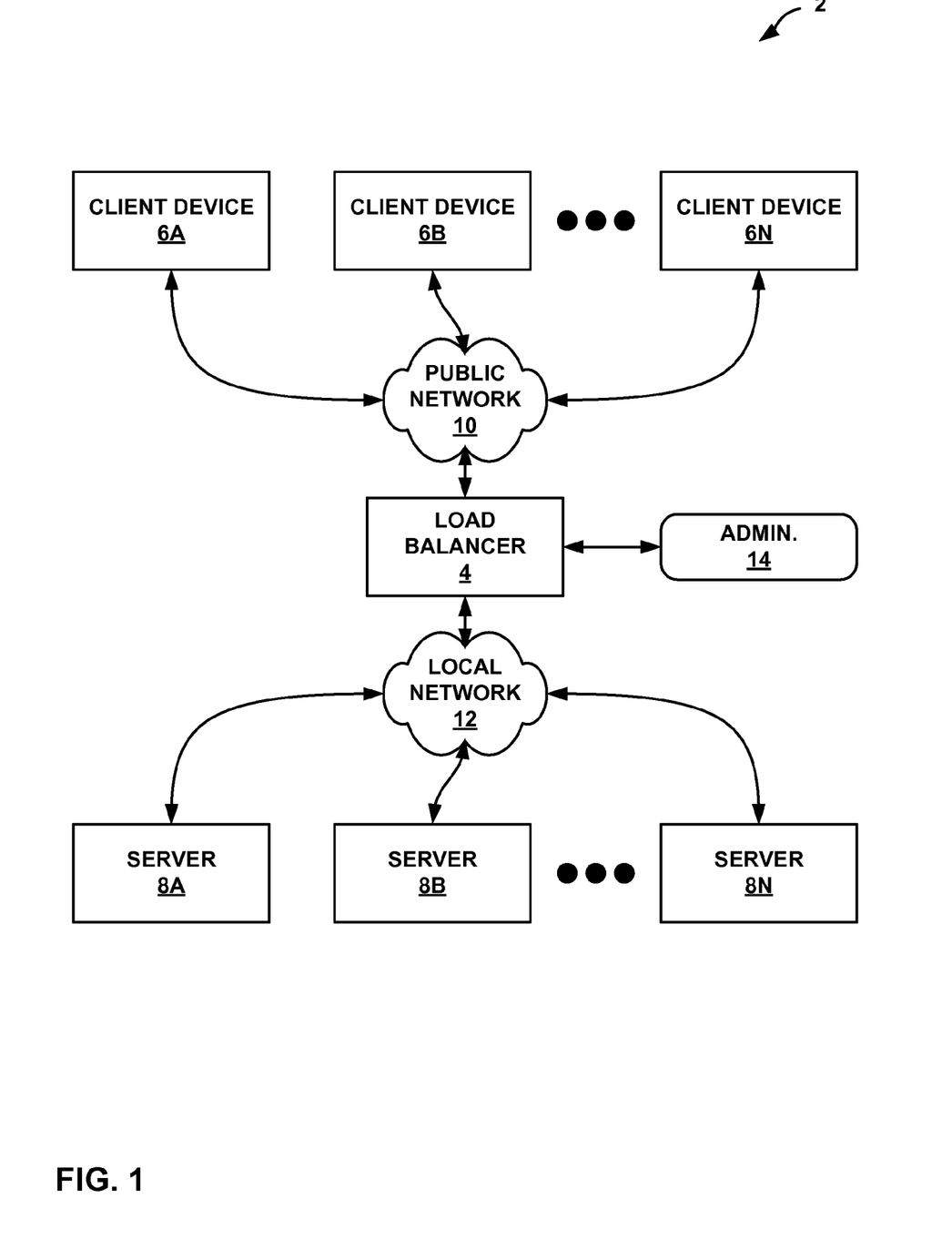
FIG. 1 is a block diagram illustrating an exemplary system in which a load balancer distributes network communications from a set of client devices among a set of network servers based, at least in part, on electrical power consumption of the network servers.

FIG. 1 is a block diagram illustrating an exemplary system 2 in which a load balancer 4 distributes network communications from a set of client devices 6A through 6N among a set of network servers 8A through 8N based, at least in part, on electrical power consumption of the network servers.

Client devices 6A through 6N (collectively, "client devices 6") may be personal computers, intermediate network devices, network telephones, network gaming platforms, cellular telephones, network televisions, television set-top boxes, and so on. Moreover, each of client devices 6 may be a different kind of network device. For instance, client device 6A may be a personal computer while client device 6B may be an intermediate network device.

Servers 8A through 8N (collectively, "servers 8") may be any of several types of server that provide one or more resources or network services. For example, servers 8 may be web servers that provide web pages, media servers that provide streaming audio and/or video content, file servers that provide one or more files, application servers that provide an application, and so on. Furthermore, servers 8 may be logically grouped so as to constitute a "server farm" or group of servers.

To access resources provided by servers 8, client devices 6 may send network communications through a public network 10 to load balancer 4, which typically may be located behind a firewall and within a local network 12. Public network 10 may be a wide-area network such as the Internet. In other exemplary embodiments, a private network, such as a local-area network, a wireless network, or other type of network may be substituted for public network 10. Furthermore, client devices 6 may send the network communications through a virtual private network over public network 10 to load balancer 4.

When load balancer 4 receives a communication from one of client devices 6, load balancer 4 forwards the network communication to one of servers 8 via a private network 12 based, at least in part, on the relative power consumption rates of servers 8. Local network 12 may be a local-area network or otherwise. For example, local network 12 may be an Ethernet network that facilitates communication among network devices in a data center.

Alternatively, load balancer 4 may receive a Domain Name System (DNS) request to resolve a domain name of a resource provided by servers 8. In response to the DNS request, load balancer 4 may send a DNS response that lists network addresses of servers 8 sorted in an order based on the relative power consumption rates of servers 8. While the remainder of this specification describes techniques of forwarding and processing network communications, the techniques described herein are generally applicable to this DNS-based approach.

Prior to distributing network traffic from client devices 6 among servers 8, load balancer 4 may obtain corresponding power consumption rates for servers 8 or for logical groups of servers. Power consumption rates may be defined and obtained in a variety of ways. Accordingly, load balancer 4 may apply different techniques to obtain such power consumption rates for servers 8.

As one example, load balancer 4 may define power consumption rates for servers 8 as the average amounts of power each of the servers consumes over a defined period (e.g., per hour) when operating normally. In this case, load balancer 4 may compute the power consumption rates by first sending requests to servers 8 for listings of hardware components in respective ones of servers 8. For example, these requests may be Simple Network Management Protocol (SNMP) requests to Management Information Bases (MIBs) on servers 8. After receiving a listing of hardware components for one of servers 8, load balancer 4 may automatically access one or more data sources, such as vendors' web sites or databases, to obtain power consumption rates for the listed components. Load balancer 4 may, for example, accomplish this by way of an automated invocation of an application programming interface (API) presented by a vendor's data source. Load balancer 4 may then compute an overall power consumption rate for each of the servers by summing the power consumption rates of the constituent components of each of the servers.

In another example, power consumption rates for servers 8 may be defined in terms of the power consumed when processing differing types of network communications likely to be received from client devices 6. That is, the power consumption rates may be defined with respect to the different types of communication protocols. For instance, servers 8 may provide one or more a web sites, e.g., by hosting one or more web servers and, optionally, application servers and database servers that support the web sites. Accordingly, network communications from client devices 6 are likely to include HyperText Transfer Protocol (HTTP) communications, such as HTTP GET requests for web pages provided by servers 8. In this example, load balancer 4 may perform techniques to quantify specific power consumption rates for each of servers 8 when each of servers 8 process particular types of HTTP communications, such as HTTP GET requests. To quantify power consumption rates for each of servers 8 with this increased level of granularity, load balancer 4 may send probe HTTP GET requests to each of servers 8 and obtain measurements of the rates of power consumption while the servers process the requests. As one example, load balancer 4 may obtain measurements of the rates of power consumption by receiving power measurements from electrical sensors on servers 8 and correlating the power measurements with time periods during which the servers were processing the requests.

As another example, load balancer 4 may obtain power consumption rates for each of servers 8 with respect to particular, individual network resources identified individual resources identified by universal resource locators (URL). Similarly, load balancer 4 may obtain power consumption rates for each of servers 8 with respect to individual network applications executing on servers 8. In this way, load balancer 4 may store multiple power consumption rates with a variety of granularities for each of servers 8, e.g., server-level granularity, application-level granularity and resource-level granularity.

After obtaining power consumption rates for servers 8, load balancer 4 may categorize servers 8 into classes based on the power consumption rates of servers 8. Each of the classes may be associated with a different rate of power consumption and/or a different level of power consumption granularity. In this way, load balancer 4 may construct and maintain a power consumption profile for each of servers 8 or group of servers 8. For example, a first class may be associated with a power consumption rate of 40 watts per hour and a second class may be associated with a power consumption of 60 watts per hour. Additional classes may be used to categorize servers 8 based on rates of power consumption when the servers process request for specific types of network application (e.g., HTTP, FTP, NAT, DNS, encryption/decryption, etc.). Furthermore, classes may be used to categorize servers 8 based on rates of power consumption when servers 8 process requests for specific network resources or services provided by specific types of network applications (e.g., HTTP in combination with a particular URL or DNS request for a particular network prefix). Subsequently, load balancer 4 may use these classes when distributing network traffic from client devices 6 among servers 8.

To distribute network traffic from client devices 6 among servers 8, load balancer 4 may first, for each network communication, identify the type of the network communication received from the client device. Load balancer 4 may then identify and select one of servers 8 based on the power consumption profile of the server. For example, when load balancer 4 receives a network communication, load balancer 4 may identify a class of servers 8 associated with the lowest rate of power consumption when processing that particular type of network communication. Load balancer 4 may further narrow the selection to a reduced class of servers by identifying individual resources or services being requested.

Load balancer 4 may then forward the network communication to a server in this class of servers 8 unless load balancer 4 determines that a current utilization rate of the server is above a threshold for the class of the server. A utilization rate may, for example, represent the percentage of resources (e.g., processor capacity, random access memory usage, bandwidth usage, etc.) currently being utilized by a server. For example, when a processor of the server is operating at or above a certain threshold of capacity (e.g., 90%), load balancer 4 may consider a current utilization rate of the server to be above the utilization threshold set for the class of the server.

When load balancer 4 determines that current utilization rates of servers in this class are above a certain class utilization threshold, load balancer 4 may identify a class of servers 8 associated with a rate of power consumption that is higher than that of the previous class of servers 8, but lower than rates of power consumption associated with other classes of servers 8. If load balancer 4 determines that utilization rates of servers in this class are above a utilization threshold for this class, load balancer 4 may identify a class of servers associated with a next lowest rate of power consumption after this class, and so on. Eventually, load balancer 4 may identify a class of servers 8 whose servers have current utilization rates that are not above a utilization threshold for the class and whose servers consume less electrical power to process network communications of the identified type of the network communication than other ones of the servers whose current utilization rates are not above their utilization thresholds for their respective classes. Load balancer 8 may then select one of the servers in the identified class.

In addition to a power consumption classification, load balancer 4 may also use a current performance characteristic of servers 8 as a factor in identifying a class of servers 8. A performance characteristic is a measure of how quickly an individual server generates a response after receiving a request. For example, a performance characteristic may be computed based on response times of the servers (e.g., response times to requests, dropped packets, counts of packets already forwarded to the servers, etc.) Servers in a class associated with low power consumption rates may respond to requests more slowly than servers in a class associated with higher power consumption rates. To optimize or otherwise improve both power consumption and the performance characteristic, load balancer 4 may apply a static or dynamic weighting scheme. As one example, in identifying a class of servers 8, load balancer 4 may use a weighting scheme in which responsiveness is always weighted twice as heavily as power consumption. In an alternative example, load balancer 4 may use a weighting scheme in which a weight associated with responsiveness is rises or falls when overall power consumption of servers 8 decreases or increases. In this way, load balancer 4 may identify a class of servers 8 in which overall power consumption rates may be managed while still utilizing ones of servers 8 that are most responsive.

Load balancer 4 automatically issue communications to instruct servers in particular classes to enter a low power consumption mode (i.e., a "sleep mode" or a "hibernation mode"). When one of servers 8 is in hibernation mode, the server consumes a minimal amount of power. For example, if server 8N is in a class of servers associated with relatively high power consumption rates and the overall number of requests to servers 8 is low, servers 8 in classes associated with lower power consumption rates may be able to process all of the requests. In this situation, load balancer 4 may instruct server 8N to enter hibernation mode. Later, when the overall number of requests to servers 8 is higher or the utilization of the servers in lower-power consumption classes reaches defined thresholds, load balancer 4 may automatically instruct server 8N to exit hibernation mode in order to be ready to process requests.

Each of servers 8 may operate a plurality of virtual machines that provide operating environments for one or more software applications. For example, each of servers 8 may operate production, test, and development virtual machines that provide operating environments for production, test, and development applications. Load balancer 4 may distribute requests among the virtual machines as though the virtual machines were separate sets of physical machines according to the techniques described herein.

Furthermore, load balancer 4 may redistribute the virtual machines among servers 8 to reduce overall power consumption rate of the servers. For example, load balancer 4 may track the utilization rates and power consumption rates of each of servers 8. Each of the virtual machines may be associated with a priority. For example, the "production" virtual machine may have a higher priority than the "development" virtual machine. Lower priority virtual machines may be virtual machines that handle fewer requests than higher priority virtual machines. When a utilization rate of one of servers 8 approaches a given threshold, load balancer 4 may send instructions to the server to terminate a lower-priority virtual machine or otherwise limit the resources available to the lower-priority virtual machine. This may make more resources available to the higher-priority virtual machine. In addition, load balancer 4 may send instructions to a second one of servers 8 associated with a higher power consumption rate to increase the resources available to a virtual machine that is equivalent to the lower-priority virtual machine on the second server. In this way, load balancer 4 may reduce the overall power consumption of servers 8.

Figure 2:
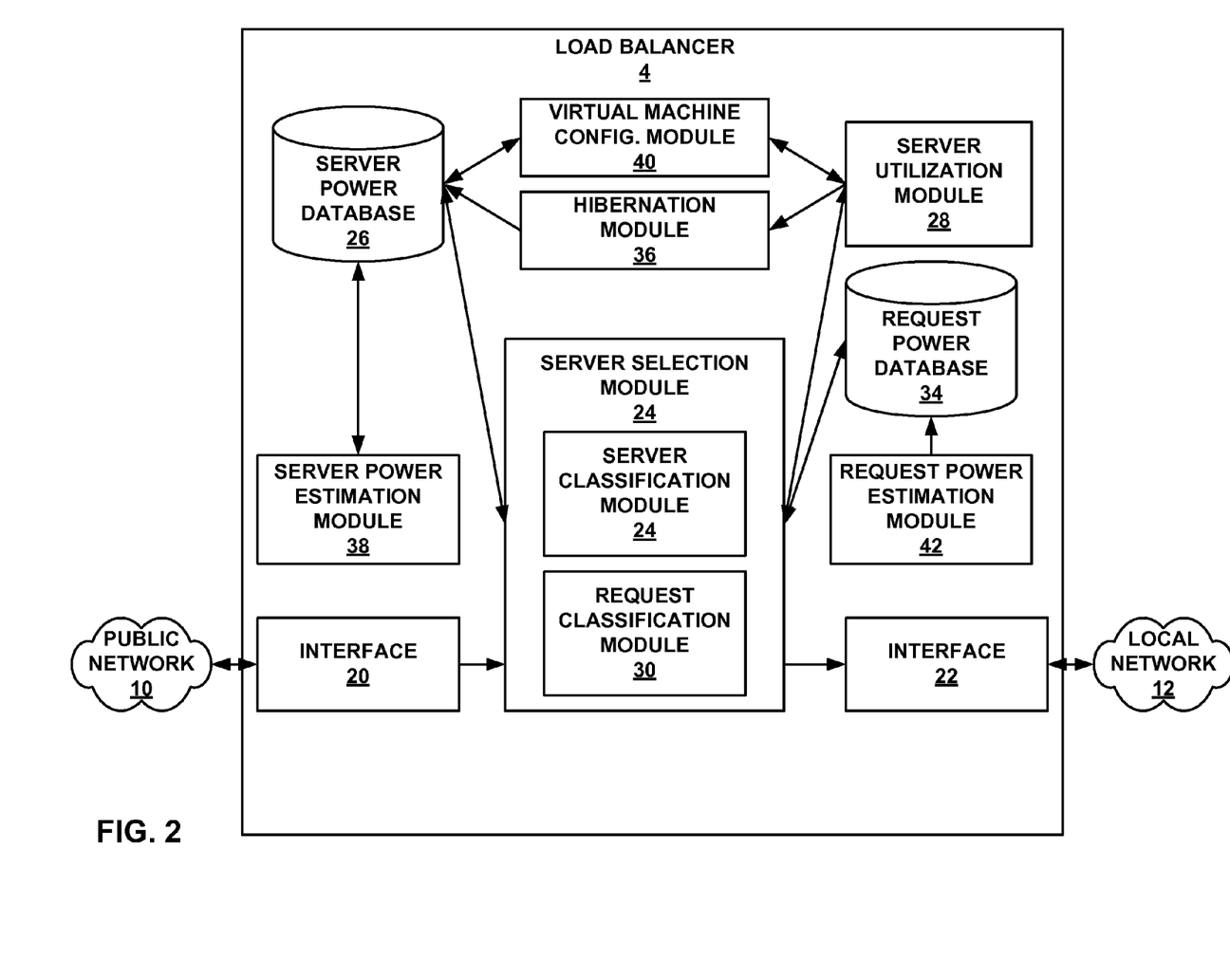
FIG. 2 is a block diagram illustrating an exemplary load balancer that distributes network communications based, at least in part, on electrical power consumption of the network servers.

FIG. 2 is a block diagram illustrating an exemplary load balancer 4 that distributes network communications based, at least in part, on electrical power consumption rates of the network servers. Load balancer 4 includes an interface 20 to facilitate communication between load balancer 4 and public network 10. Furthermore, load balancer 4 includes an interface 22 to facilitate communication between load balancer 4 and local network 12. Interface 20 and interface 22 may comprise network interface cards, device ports, or otherwise.

Load balancer 4 includes a server power estimation module (SPEM) 38 to estimate power consumption rates of servers 8 based on power consumption rates of hardware components included in servers 8. To estimate how much power each of servers 8 consume, SPEM 38 may initially send an SNMP request to each of servers 8 for catalogs of hardware components associated with respective ones of servers 8. In response to such an SNMP request, one of servers 8 may send an SNMP response to SPEM 38 to provide a listing of the hardware components of the server. For example, server 8A may send a response that provides a listing that specifies that server 8A includes an Intel Pentium processor, a hard disk drive from manufacturer X, and a hard disk drive from manufacturer Y. Continuing this example, server 8N may send a response that provides a listing that specifies that server 8B includes an Advanced Micro Devices Athlon processor and a hard disk drive from Seagate. Records of hardware components of the server may be stored in a Management Information Base in the server, a configuration management database, or a central asset tracking system.

After receiving the listings of hardware components associated with servers 8, SPEM 38 may determine a power consumption rate associated with each of the listed hardware components. To determine a power consumption rate for a hardware component, SPEM 38 may access one or more data sources that store a power consumption rate for the hardware component. Such data sources may be available from the vendor (e.g., the manufacturer, retailer, etc.) of the hardware component. For example, a power consumption rate may be posted on a manufacturer's web site. Alternatively, load balancer 4 may include such databases. After determining a power consumption rate associated with each of the hardware components in the listing for one of servers 8, SPEM 38 may sum the power consumption rates associated with the listed hardware components to derive an overall power consumption rate for the server. Once SPEM 38 derives an overall power consumption rate for the server, SPEM 38 may store the overall power consumption rate for the server in server power database 26.

In an alternative example, SPEM 38 invokes scripts on servers 8 to determine the power consumption rates associated with each of servers 8. For example, SPEM 38 may use a technique, such as ActiveX or Java, to invoke scripts or other programs that execute locally on servers 8. A script executing on one of servers 8 may generate a listing of hardware components of the server and send this listing to SPEM 38. SPEM 38 may then use a data source to determine a power consumption rate associated with each of the listed components. Alternatively, the script may access the data source directly and send to SPEM 38 an overall power consumption rate associated with the server.

SPEM 38 may also determine an aggregate power consumption rate associated with groups of servers 8. For example, servers 8A and 8B may collaborate to provide a resource. In this case, SPEM 38 may receive listings of hardware components from servers 8A and 8B and obtain power consumption rates associated with the components of servers 8A and 8B. SPEM 38 may then add together all of the power consumption rates of components of servers 8A and 8B to obtain an overall power consumption rate for the combination of servers 8A and 8B. In this way, SPEM 38 may obtain power consumption rate at varying degrees of granularity. Administrator 14 may define which ones of servers 8 SPEM 38 regards as groups.

Furthermore, SPEM 38 may identify classes of servers 8 based on power consumption rates of servers 8. For example, SPEM 38 may categorize all servers 8 having power consumption rates below 50 watts in a first class and all server having power consumption rates of 50 watts or higher in a second class. SPEM 38 may record these classes in server power database 26.

Load balancer 4 may also include a request power estimation module (RPEM) 42 to estimate power consumption rates of servers 8 when processing one or more types of network communications (referred to generally as requests). In order to estimate power consumption rates of servers 8 when processing a particular type of request, RPEM 42 may first access a request power database 34. Request power database 34 contains records, each of which associate a type of request with one of servers 8 and a power consumption rate. For example, request power database 34 may contain a record that indicates that server 8A consumes 50 watts to process a request for streaming media.

If RPEM 42 determines that request power database 34 does not contain a record that associates the type of request with one of servers 8, RPEM 42 may generate a probe communication that includes a request of this type. RPEM 42 may then forward this communication to the server. At the same time, RPEM 42 may monitor the average power consumption of the server while the server is processing the communication. RPEM 42 may use one or more SNMP requests to the server to monitor the average power consumption of the server while the server is processing the communication. Alternatively, RPEM 42 may receive power consumption information from a baseboard management controller (BMC) that monitors sensors in server. The sensors may include temperature sensors, analog-to-digital converters to measure current and voltage on various power supplies in the server, and so on. In either case, RPEM 42 may determine a power consumption rate by correlating the received power consumption information with the specific period starting after the probe communication was sent and a response was received. After determining a power consumption rate for the server for the type of request, RPEM 42 may update request power database 34 to include a record that associates the request type, server, and measured power consumption rate. RPEM 42 may repeat this process until request power database 34 includes a record for each server for each request type.

Furthermore, RPEM 42 may identify classes of servers 8 for various types of requests. For example, RPEM 42 may identify records in request power database 34 having a common request type. RPEM 42 may then identify classes of servers 8 by determining which of the records having approximately equivalent power consumption rates. For example, RPEM 42 may order all of the identified records by power consumption rating. RPEM 42 may then identify the first third of the servers specified by the ordered identified records as being in a first class, the second third of servers specified by the ordered identified records as being in a second class, and so on. RPEM 42 may repeat this process for each type of request specified in the records of request power database 34. In this way, RPEM 42 may identify classes of servers 8 for each request type.

When interface 20 receives a network communication from public network 10, interface 20 forwards the communication to a server selection module (SSM) 24. Upon receiving the network communication from interface 20, SSM 24 may access power consumption profiles for servers 8 and determine a rate of electrical power consumption for the servers using the power consumption profiles of the servers. SSM 24 may then identify one of servers 8 based, at least in part, on power consumption rates of servers 8. After identifying one of servers 8, SSM 24 provides the network communication to interface 22. Interface 22 may then forward the communication to the one of servers 8 identified by SSM 24.

As illustrated in the example of FIG. 2, SSM 24 includes a server classification module 24. Server classification module 24 uses estimates of power consumption rates of servers 8 based on power consumption rates of hardware components included in servers 8 to identify one of servers 8 that would consume the least power to process the communication, given the utilization of server 8. To identify one of servers 8 that would most efficiently process the communication, server classification module 24 may access server power database 26 to obtain classifications of servers 8. Server classification module 24 may then access a server utilization module 28. Server utilization module 28 provides current utilization rates of servers 8. Based on the records from server power database 26 and the current utilization rates from server utilization module 28, server classification module 24 may identify a class of servers 8 that is not "over-utilized" and that consumes the least power. Server classification module 24 may determine a class of servers is over-utilized when the average utilization rate of the servers in the class exceeds a given utilization threshold. For example, a class of servers may be "over-utilized" when the average server in the class is operating at 85% of capacity.

Server classification module 24 identify one of servers 8 that is not over-utilized that is capable of processing the communication with a combined level of power consumption and response time to the network communication that is less than combined levels of power consumption to process the communication and response time to the network communication of other ones of the servers that are not over-utilized. For example, server classification module 24 may calculate a combined level of power consumption and response time for a server by multiplying a first weight by a performance characteristic for the server plus a second weight multiplied by a power consumption rate for the server. Server classification module 24 may then compare combined levels of power consumption and response time for each of the servers that is not over-utilized to identify one of servers 8 that has the lowest overall combined level of power consumption and response time.

SSM 24 also includes a request classification module 30. Request classification module 30 identifies a type of request associated with a received communication and identifies one of servers 8 that would most efficiently process a member of the identified type of request, given current utilization rates of servers 8. After request classification module 30 has identified a type of request for the network communication, request classification module 30 may obtain records from request power database 34 for the identified type of request. Request classification module 30 may then access server utilization module 28 to obtain current server utilization data. Then, using the current server utilization data, request classification module 30 may identify a class of servers 8 that are not over-utilized and that are associated with the lowest power consumption ratings to process requests in the identified type of request. Request classification module 30 may then forward the communication to one of servers 8 in the identified class of servers.

Load balancer 4 also includes a hibernation module 36. Hibernation module 36 sends instructions to one of servers 8 to enter a low power consumption mode (e.g., a hibernation mode or a standby mode) when the server consumes more power than other ones of servers 8 and when the server is unlikely to be utilized for a given period of time. For example, server 8N may be in a class of servers 8 that is associated with high power consumption rates. During times when utilization of servers 8 is relatively low (e.g., on nights or weekends) and ones of servers 8 in classes associated with lower power consumption rates are sufficient to process all requests to servers 8, hibernation module 36 may send instructions to server 8N to enter a hibernation mode. To determine which ones of servers 8 are in which classes and to determine the utilization of servers 8, hibernation module 36 may access server power database 26 and server utilization module 28. When server 8N receives the instructions to enter a hibernation mode, server 8N may store the content of its volatile memory (e.g., Random Access Memory) to a persistent storage medium, shut down disk drives, cooling systems, and other systems of server 8N that consume power. However, server 8N may continue to operate a process that waits for instructions to reenter a normal power consumption mode.

Subsequently, when utilization of servers 8 is higher and ones of servers 8 in classes associated with lower power consumption are not sufficient to process all requests to servers 8, hibernation module 36 may send instructions to server 8N to reenter a normal power consumption mode. For example, hibernation module 38 may send instructions to server 8N to reenter a normal power consumption mode when ones of servers 8 in a class associated with lower power consumption ratings are operating at 75% of capacity. In another example, hibernation module 38 may send instructions to server 8N to reenter a normal power consumption mode when hibernation module 38 determines that it is time of day associated with high utilization. Upon receiving the instructions to reenter a normal power consumption mode, server 8N may restore its volatile memory from the persistent storage medium, power-up disk drives and cooling systems, and so on. When server 8N reenters the normal power consumption mode, server 8N may begin processing requests.

Load balancer 4 may also include a virtual machine configuration module (VMCM) 40 to redistribute the virtual machines among servers 8 to reduce overall power consumption of servers 8. For example, VMCM 40 may maintain records of which virtual machines are operating on which ones of servers 8. For instance, VMCM 40 may maintain records indicating that server 8A is operating a development virtual machine and a production virtual machine. The development virtual machine may provide an operating environment for applications that are currently under development within an enterprise. The production virtual machine may provide an operating environment for applications that are currently used by clients of the enterprise. For example, the production virtual machine may provide an operating environment for a web server that provides an e-commerce web page to clients. Because it may be more important to provide clients with a minimum response time than to provide developers with access to development applications, the production virtual machine may have higher priority than the development virtual machine.

VMCM 40 may access server utilization module 28 to obtain utilization rates for each of servers 8 and access server power database 26 to obtain power consumption rates for each of servers 8. VMCM 40 may then use the utilization rates and power consumption rates to determine whether to redistribute virtual machines on servers 8 among servers 8 such that response times to the clients are the shortest and the overall power consumption of servers 8 is the lowest. For example, administrator 14 may define thresholds for network traffic, server load, and server response times. If any of these thresholds are surpassed on one of servers 8, VMCM 40 may instruct a lower priority virtual machine operating on the server to cease operating or to transfer operations to another one of servers 8. For example, VMCM 40 may send a request to a virtual server management platform, such as IBM WebSphere, to terminate the lower-priority virtual machine. In another example, VMCM 40 may send the request directly to a virtualization software layer executing on the server. By terminating the lower-priority virtual machine on the server, the server may have more resources to devote to requests for the higher-priority virtual machine. This may result in a decrease in overall power consumption because servers associated with higher power consumption ratings are less likely to process requests associated with the higher-priority virtual machine.

Figure 3:
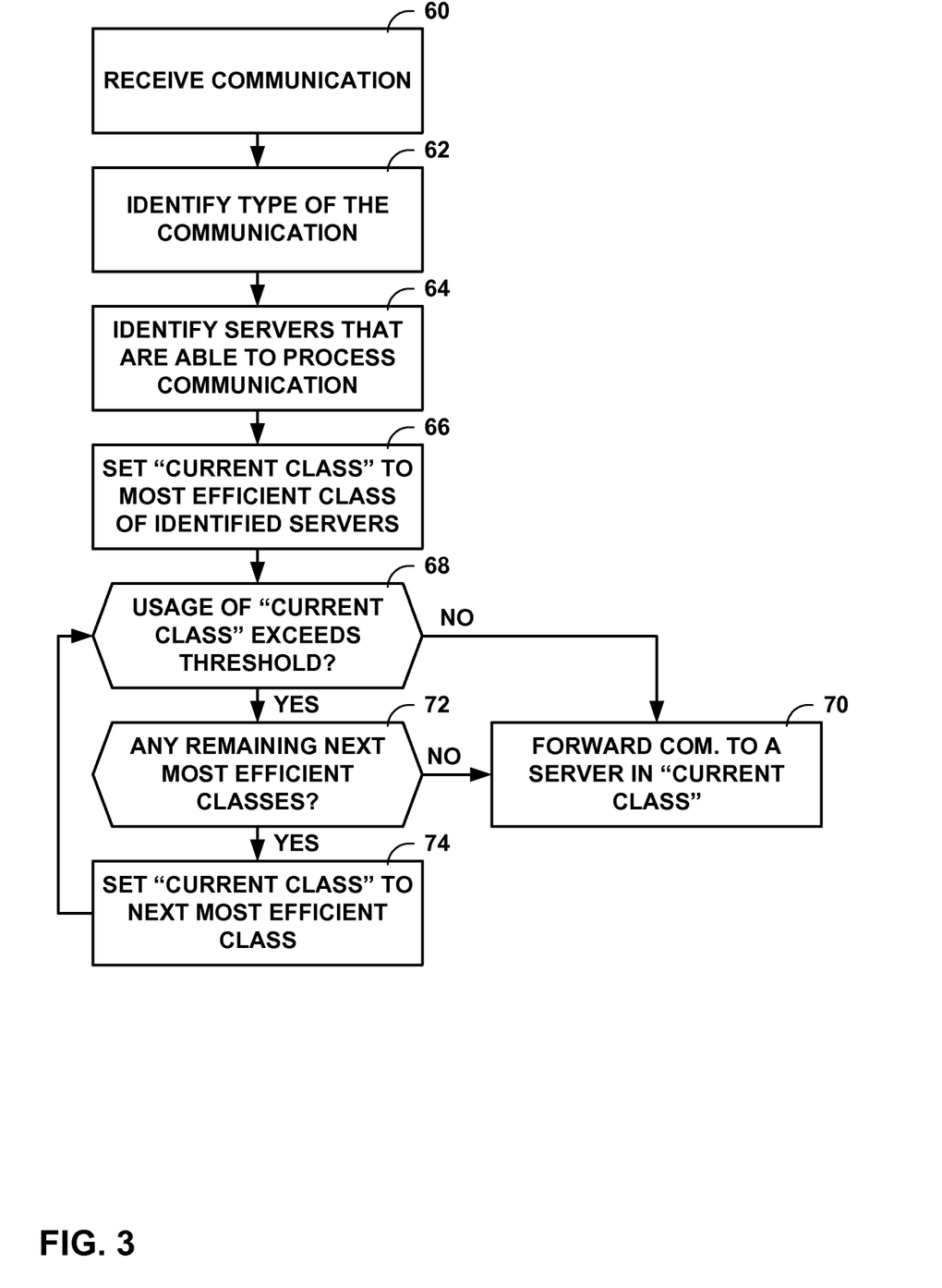
FIG. 3 is a flowchart illustrating exemplary operation of a load balancer to distribute network communications based, at least in part, on power consumption classifications of the network servers.

FIG. 3 is a flowchart illustrating an exemplary operation of load balancer 4 to distribute network communications based, at least in part, on power consumption classifications of network servers 8. Initially, server classification module 24 in load balancer 4 may receive a network communication in the form of one or more packets (60). Server classification module 24 may then identify a type of the network communication (62). After identifying the type of the network communication, server classification module 24 may identify ones of servers 8 that are able to process the identified type of network communication (64). Server classification module 24 may then initialize an internal "current class" variable to indicate the class of the identified servers associated with the lowest power consumption rates (62). Next, server classification module 24 may determine whether the utilization rate of the servers in the "current class" exceeds a utilization threshold (68). For example, server classification module 24 may determine that the utilization rate of the servers in the "current class" exceeds the threshold when utilization of the servers exceeds 85%.

If server classification module 24 determines that the utilization rate of the servers in the "current class" does not exceed the threshold ("NO" of 68), server classification module 24 forwards the network communication to one of the servers in the "current class" of servers (70). On the other hand, if server classification module 24 determines that the utilization rate of the servers in the "current class" exceeds the utilization threshold ("YES" of 68), server classification module 24 determines whether there are any remaining classes of servers 8 associated with power consumption rates immediately higher than the power consumption rates associated with servers in the "current class" and capable of servicing the received request (72). If server classification module 24 determines that there is not a remaining class of servers 8 associated with next-higher power consumption rates that are capable of servicing the received request ("NO" of 72), server classification module 24 may forward the network communication to one of the servers in the "current class" of servers (70). However, if server classification module 24 determines that there is a remaining class of servers 8 associated with a next-higher rate of power consumption ("YES" of 72), server classification module 24 may set the label "current class" to indicate this class of servers 8 (74). Server classification module 24 may then determine whether the usage of the servers in the new "current class" exceeds a utilization threshold (68), and so on.

Request classification module 30 may perform a similar operation as that described in the example of FIG. 3. However, request classification 30 may first identify a type of request included in the network communication and then access request power database 34 to retrieve classes of servers 8 for the identified type of request.

Figure 4:
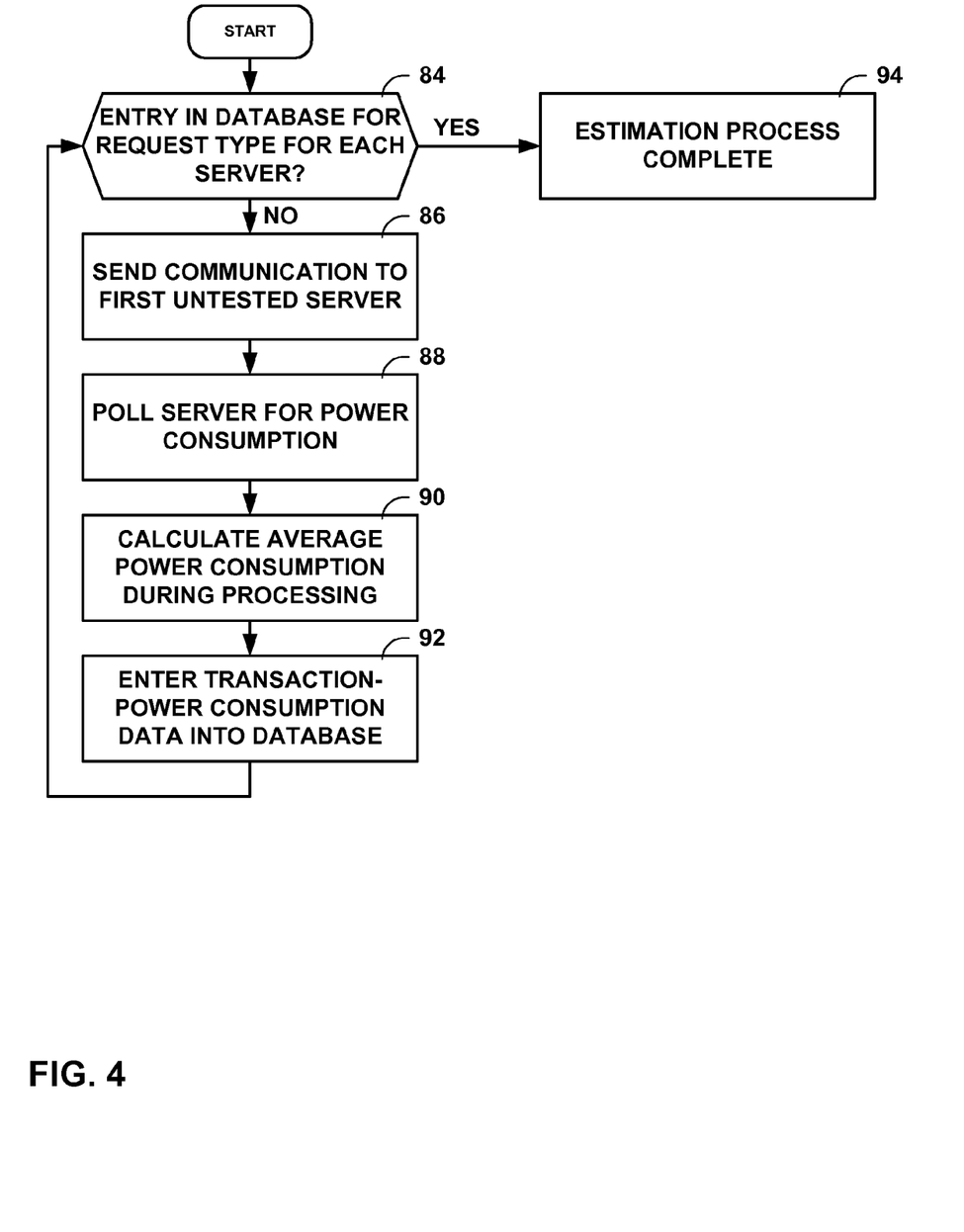
FIG. 4 is a flowchart illustrating exemplary operation of a load balancer to estimate an amount of electrical power a server or group of servers consumes to process a type of request.

FIG. 4 is a flowchart illustrating an exemplary operation of load balancer 4 to estimate an amount of electrical power a server or group of servers consumes to process a particular type of request. Initially, RPEM 42 determines whether request power database 34 already includes records that specify a power consumption rate for the request type for each of servers 8 (84). If RPEM 42 determines that request power database 34 does not include such a record for each of servers 8 ("NO" of 84), RPEM 42 generates a probe communication that includes a request of the identified type and sends the probe communication to one of servers 8 for which there is not a record for the request type (86). At about the same time, RPEM 42 may poll the server to which RPEM 42 sent the communication to obtain a power consumption data for the server while the server processes the network communication (88). After obtaining the power consumption data from the server, RPEM 42 may correlate the power consumption data with the time the server spent servicing the communication so as to calculate an average rate of power consumed by the server when processing the communication (90). RPEM 42 may then create a new record in request power database 34 that relates the request type of the network communication to the calculated power consumption rate (92). Next, RPEM 42 may again determine whether request power database 34 includes records that specify a power consumption rate for the request type for each of servers 8 (84). If request power database 34 includes records that specify a power consumption rate for the request type for each of servers 8 ("YES" of 84), the process of estimating an amount of electrical power a server or group of servers consumes to process a type of request may be complete (94). In this way, RPEM 42 may create a record in request power database 34 for each of servers 8.

Figure 5:
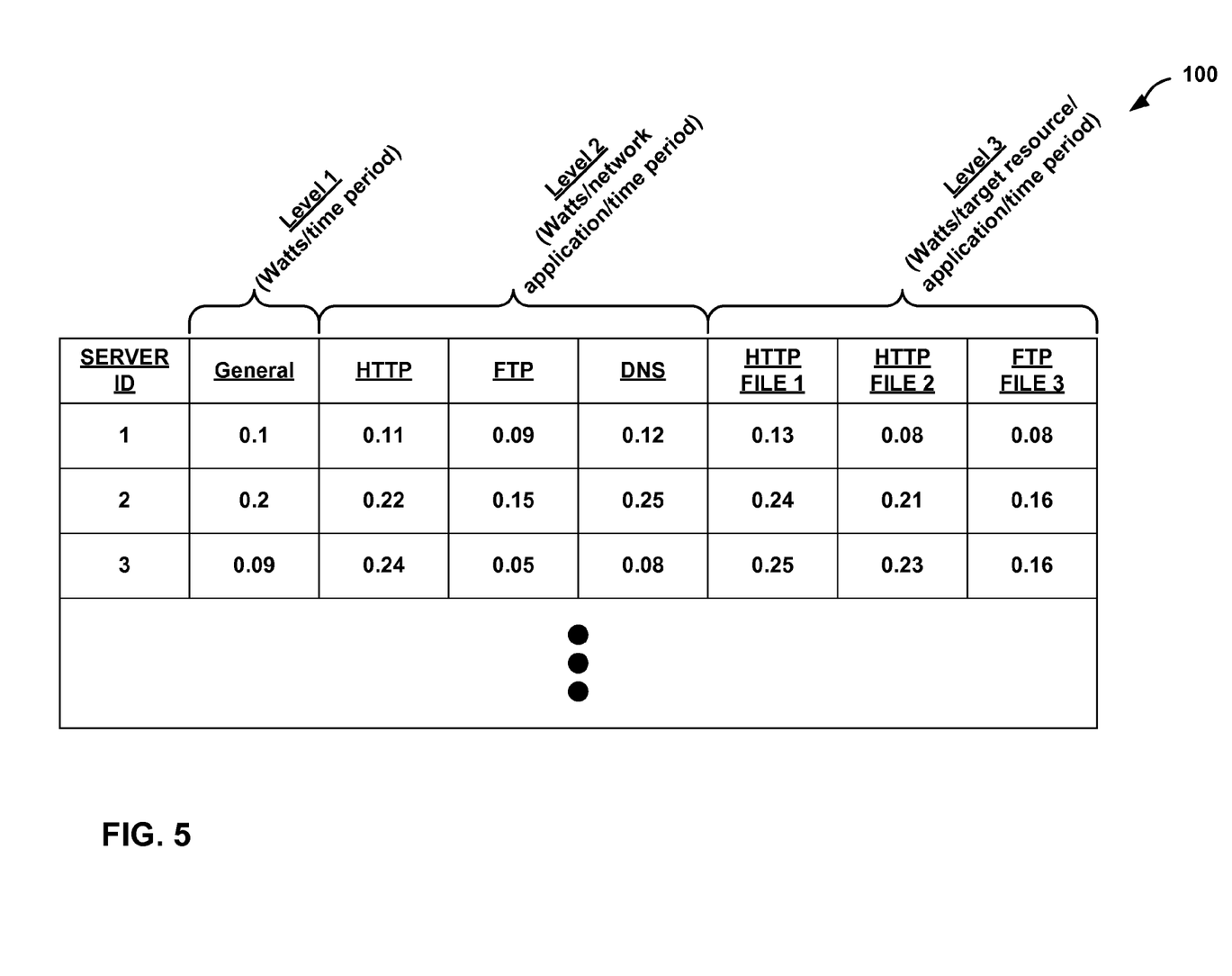
FIG. 5 is a diagram illustrating an exemplary table of power consumption profiles for a plurality of servers.

FIG. 5 is a diagram illustrating exemplary a table 100 of power consumption profiles for servers 8. As illustrated in the example of FIG. 5, each row of table 100 represents a power consumption profile for one of servers 8. Each entry in a first column of table 100 represents a server ID number that indicates one of servers 8. In some embodiments, each entry in the Server ID column may be a network address of one of servers 8.

Each entry in a second column of table 100 represents a general rate of power consumption for a server. For instance, a server in table 100 with server ID "1" has a general rate of power consumption of 0.1 watts per time period. Entries in the second column of table 100 may represent a first level of granularity that specifies an average power consumption rate for a server.

Each entry in a third, fourth, and fifth column of table 100 represents a rate of power consumption of a server when the server processes for a network communication associated with a particular network application. For instance, each entry in the third column represents a rate of power consumption for a server when the server processes a network communication associated with an HTTP application. Similarly, each entry in the fourth and fifth columns represent rates of power consumption of a server when the server processes network communications associated with the FTP and DNS applications, respectively. For example, a server in table 100 with server ID "1" has a rate of power consumption of 0.11 watts per time period when processing network communications associated with the HTTP application. Because entries in the third, fourth, and fifth columns of table 100 represent rates of power consumption for a server when the server is processing a network communication associated with a network application, entries in these columns describe rates of power consumption at a lower level of granularity than entries in the second column of table 100. Thus, the third, fourth, and fifth columns may represent a second level of granularity that specifies power consumption rates for the server with respect to a plurality of different types of network applications.

Each entry in a sixth, seventh, and eighth column of table 100 represents a rate of power consumption of a server when the server is processing a network communication for request for a resource associated with a particular network application. For instance, each entry in the sixth column represents a rate of power consumption of a server when the server processes a network communication for a resource named "File 1," which is associated with the HTTP service. As illustrated in the example of FIG. 5, the server having server ID "1" has a rate of power consumption of 0.13 when the server is processing a network communication for the resource "File 1", which is associated with the HTTP network application. Although not shown in FIG. 5, table 100 may include columns for resources that include pre-generated files, dynamically-generated files, streaming media, responses to network protocol requests (e.g., a DNS response), and so on. Because entries in the sixth, seventh, and eighth columns of table 100 represents rates of power consumption for a server when the server is processing a network communication for a specific resource with a particular network application, entries in these columns describe rates at a lower level of granularity than entries in the third, fourth, and fifth columns. Thus, the sixth, seventh, and eighth columns may represent a third level of granularity that specifies power consumption rates for a server with respect to a plurality of individual network resources for different types of network applications.

Figure 6:
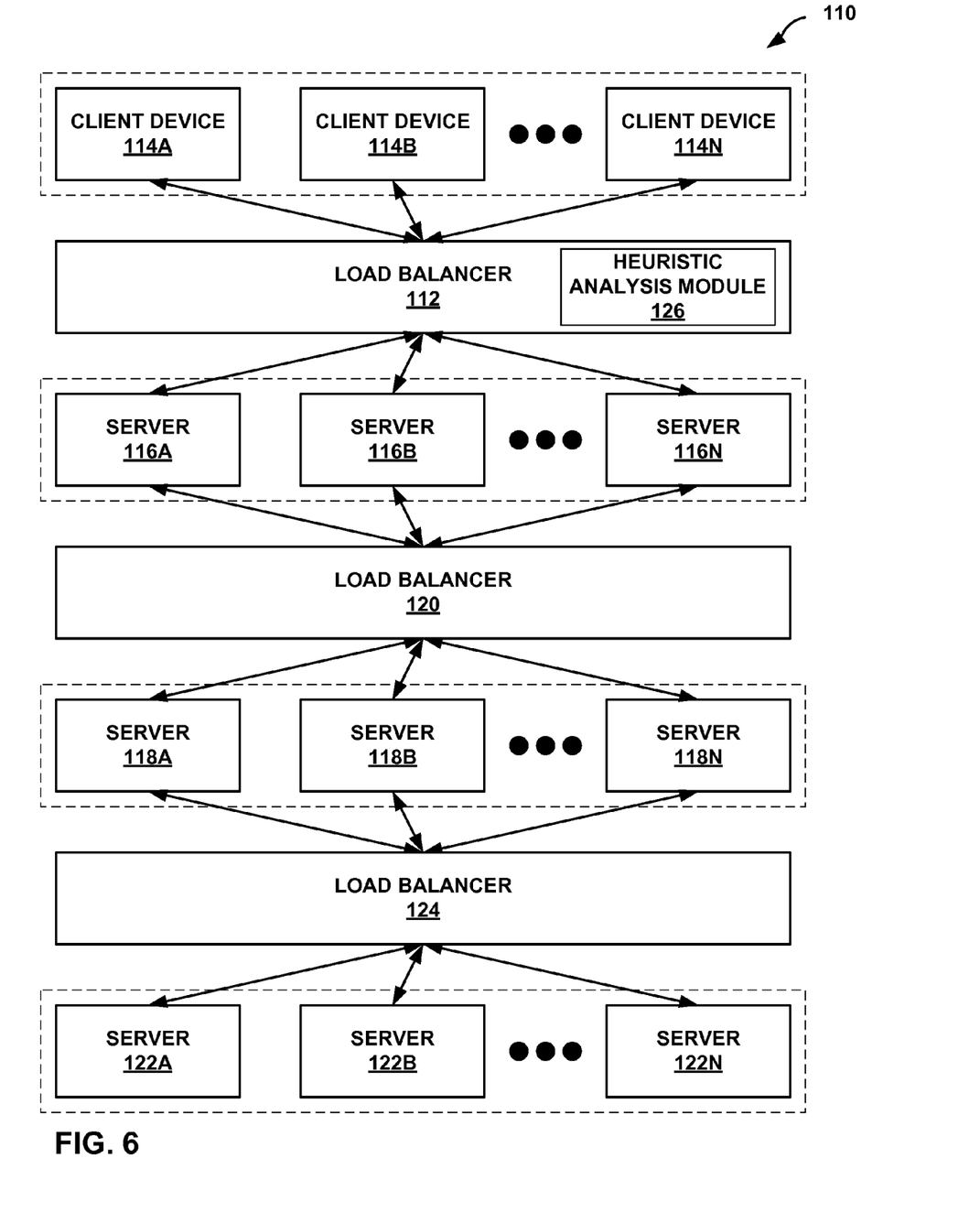
FIG. 6 is a block diagram illustrating exemplary system in which an intermediate load balancer distributes network communications from a set of client devices among a set of network servers based on electrical power consumption of the network servers and servers accessed by the network servers.

FIG. 6 is a block diagram illustrating an exemplary system 110 in which an intermediate load balancer 112 distributes network traffic from a set of client devices 114A through 114N among a set of network servers 116A through 116N based on electrical power consumption of the network servers and servers accessed by the network servers.

In system 110, client devices 114A through 114N (collectively, "client devices 114") send requests to load balancer 112. Load balancer 112 distributes the requests among servers 116A through 116N (collectively, "servers 116"). To process the requests, servers 116 may send requests to access a resource provided by a set of servers 118A through 118N (collectively, "servers 118"). A second-level load balancer 120 distributes the requests from servers 116 among servers 118. Furthermore, to process the requests from servers 116, servers 118 may send requests to access a resource provided by a set of servers 122A through 122N (collectively, "servers 122"). A third-level load balancer 124 distributes the requests from servers 118 among servers 122.

Because one of servers 116, one of servers 118, and one of servers 122 may process a request, the power consumed to process the request may be the sum of the power consumed to process the request by the one of servers 116, the one of servers 118, and the one of servers 122. However, because second-level load balancer 120 distributes requests among servers 118, load balancer 112 may not be able to accurately predict which one of servers 118 processes a request. Similarly, because third-level load balancer 124 distributes requests among servers 122, load balancer 112 may not be able to accurately predict which one of servers 122 processes the request. Consequently, load balancer 112 may not be able to determine in the manner described above how much power is consumed to process a request.

To estimate an amount of power consumed to process a request, a heuristic analysis module 126 in load balancer 112 may generate a probe communication that includes the request. Heuristic analysis module 126 determines whether a sufficient number of communications of the request type have been sent to each of servers 116 to determine how much power servers 116, servers 118, and servers 122 likely consume to process the request. If heuristic analysis module 126 determines that a sufficient number of communications of the request type have been sent to each of servers 116 to determine how much power the servers are likely to consume to process the request, heuristic analysis module 126 may have completed an estimation of the amount of power system 110 is likely to consume when load balancer 112 forward network communications containing a request type to each of servers 116. Subsequently, load balancer 112 may use these estimates to distribute network traffic among servers 116.

On the other hand, if heuristic analysis module 126 determines that an insufficient number of communications of the request type have been sent to one of servers 116 to determine how much power the servers are likely to consume to process the request if the request was sent to the one of servers 116, heuristic analysis module 126 forwards the request to the one of servers 116. Heuristic analysis module 126 then monitors the power consumption of the one of servers 116, each of servers 118, and each of servers 122. Heuristic analysis module 126 may then calculate an overall power consumption rate for the request by adding the power consumption for the one of servers 116, the one of servers 118 that processed the request, and the one of servers 122 that processed the request. Heuristic analysis module 126 may then average this overall power consumption rate with other overall power rates obtained when heuristic analysis module 126 forwarded the request to the one of servers 116. By repeating this process a sufficient number of times, heuristic analysis module 126 may obtain a relatively accurate overall power consumption rate of system 110 when a request of the request type is forwarded to the one of servers 116. Furthermore, by repeating this process a sufficient number of times on each of servers 116, heuristic analysis module 126 may obtain relatively accurate overall power consumption rates of system 110 when requests of the request type are forwarded to each of servers 116.

Alternatively, heuristic analysis module 126 may use a Bayesian algorithm to determine overall power consumption ratings of system 110 when requests are forwarded to each of servers 116. For example, heuristic analysis module 126 may include an internal model in which each of servers 116, 118, and 122 are nodes in a Bayesian network. In this model, servers 116 are the parent nodes of servers 118 and servers 118 are the parent nodes of servers 122. Heuristic analysis module 126 may then send a probe communication to one of servers 116 in order to discover the probability of one of servers 118 processing a request associated with the probe communication. Furthermore, heuristic analysis module 126 may forward communications one of servers 116 in order to discover the probability of one of servers 122 processing a request associated with the request. By discovering such probabilities for each of servers 122, heuristic analysis module 126 may estimate which ones of servers 118 and 122 are likely be active in responding to the request. Then, by discovering average rates of power consumption of each of servers 116, 118, and 122, heuristic analysis module 126 may determine how much power is likely to be consumed by servers of system 110 when heuristic analysis module 126 forwards a network communication of a certain request type to each of servers 116. Load balancer 112 may then use this information to forward network communications.

Figure 7:
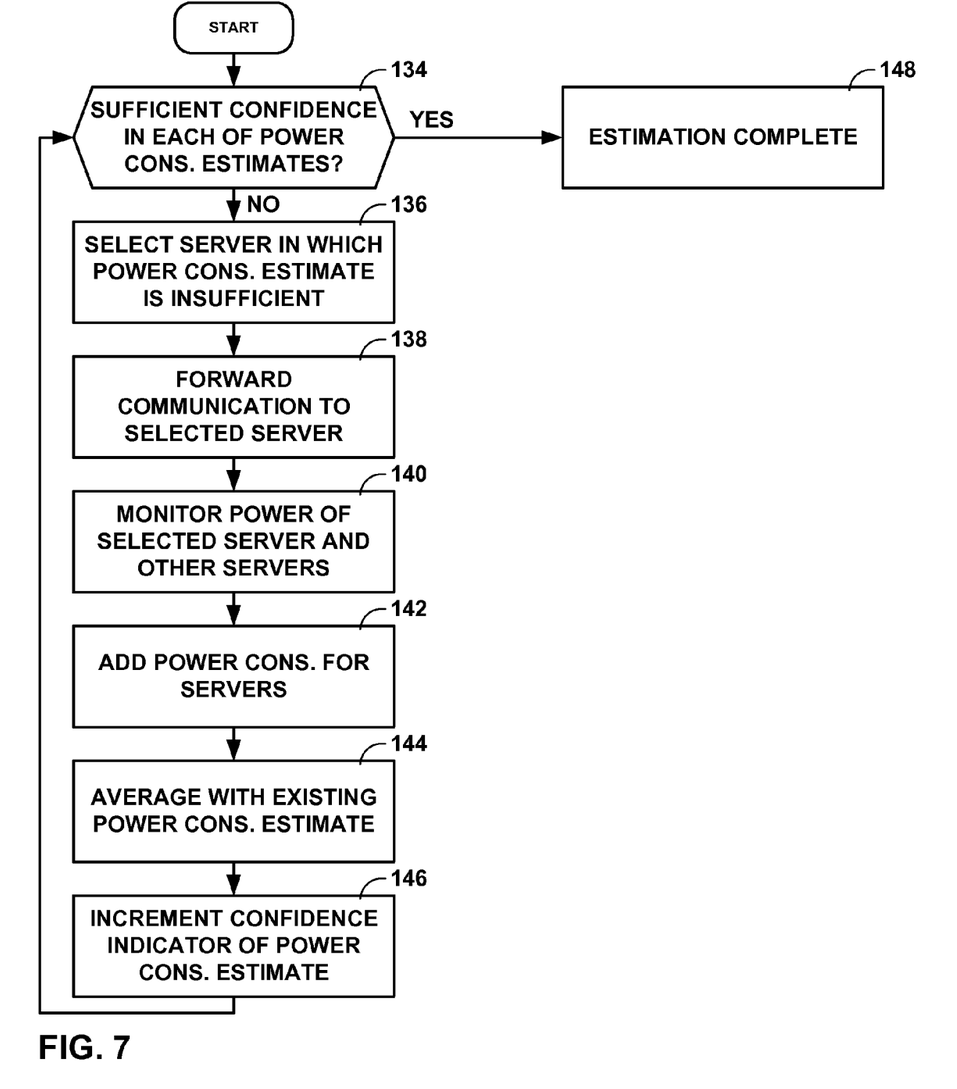
FIG. 7 is a flowchart illustrating exemplary operation of a heuristic analysis module to quantify power consumptions rates of system 110 when network communications are forwarded to various ones of servers 116.

FIG. 7 is a flowchart illustrating an exemplary operation of heuristic analysis module 126 to quantify power consumptions rates of system 110 when network communications are forwarded to various ones of servers 116. Initially, heuristic analysis module 126 may determine whether heuristic analysis module 126 has sufficient confidence in power consumption estimates of system 110 when heuristic analysis module 126 forwards network communications of the identified request type to each of servers 116 (134). For example, heuristic analysis module 126 may maintain a counter for each of the power consumption estimates. Heuristic analysis module 126 increments the counter each time heuristic analysis module 126 sends a probe communication of the identified request type to one of servers 116 and obtains a power consumption measurement. If the counter is above a given threshold, heuristic analysis module 126 may determine the heuristic analysis module 126 has sufficient confidence in a power consumption estimate.

If heuristic analysis module 126 does not have sufficient confidence in one of the power consumption estimates of system 110 when a network communication of the identified request type is forwarded to one of servers 116 ("NO" of 134), heuristic analysis module 126 selects the server (136). Heuristic analysis module 126 may then generate a probe communication that includes a request of the request type and forwards the probe communication to the selected server (138). After forwarding the probe communication to the selected server, heuristic analysis module 126 monitors the power consumption of the selected server and each of servers 118 and 122 (140). Heuristic analysis module 126 then sums the observed power consumption of the selected servers together with the observed power consumption of servers 118 and 122 to when processing the probe communication (142). Next, heuristic analysis module 126 may average this sum with an existing estimate of the power consumption of system 110 when a network communication of the identified request type is forwarded to the selected server (144). This average is now the new estimate of the power consumption of system 110 when a network communication of the identified request type is forwarded to the selected server. After averaging this sum with an existing estimate of the power consumption, heuristic analysis module 126 may increment a confidence indicator of the power consumption estimate (146). Next, heuristic analysis module 126 may again determine whether heuristic analysis module 126 has sufficient confidence in power consumption estimates of system 110 when heuristic analysis module 126 sends probe communications of the identified request type to each of servers 116 (134). If heuristic analysis module 126 has sufficient confidence ("YES" of 134), testing may be complete (148).

Various embodiments of the invention have been described. These and other embodiments are within the scope of the following claims.

The invention claimed is:

1. A computer-implemented method comprising:
   receiving, with an intermediate network device, a network communication from a computer network, wherein the intermediate network device is located between a client device and a plurality of servers;
   determining a network application associated with the network communication;
   identifying a set of the plurality of servers able to process the network communication;
   accessing a set of stored power consumption profiles that specify rates of electrical power consumption for each of the servers at a plurality of levels of granularity, wherein, for each power consumption profile, the levels of granularity specify a first level that specifies an average power consumption rate for the server, a second level that specifies power consumption rates for the server with respect to a plurality of different types of network applications, and a third level that specifies power consumption rates for the server with respect to a plurality of individual network resources for each of the different types of network applications;
   determining the rate of electrical power consumption for each of the servers using the power consumption profile of the servers;
   selecting a server in the set of servers as a function of the power consumption rate for each of the servers, wherein the power consumption rate specifies an amount of power consumed by the respective server when processing network communications associated with the network application; and
   forwarding the network communication to the selected server.

2. The method of claim 1, wherein the types of network applications include Hyper-Text Transfer Protocol server applications, File Transfer Protocol server applications, and Domain Name System server applications, and the types of network resources include pre-generated files, dynamically-generated files, streaming media, and responses to network protocol requests.

3. The method of claim 1, further comprising:
   determining an individual network resource associated with the network communication; and
   selecting the server in the set of servers as a function of a power consumption rate for each of the servers with respect to an amount of power consumed by the respective server when processing network communications associated with the individual network resource.

4. The method of claim 1, further comprising executing a process on an intermediate device to automatically estimate amounts of power consumed by each of the servers.

5. The method of claim 4, wherein automatically estimating amounts of power comprises:
receiving a listing of hardware components for each of the servers; and
automatically obtaining, with the intermediate device, power consumption ratings for each of the listed hardware components.

6. The method of claim 5, wherein obtaining power consumption ratings comprises accessing data sources with the intermediate device to obtain power consumption ratings provided by vendors of the components.

7. The method of claim 4, wherein automatically estimating amounts of power comprises communicating with the network servers to obtain measurements regarding power consumption from sensors in the servers.

8. The method of claim 4, wherein automatically estimating amounts of power comprises:
sending a probe communication from the intermediate network device to one of the servers, wherein the probe communication includes a type of request; and
polling the server to determine an amount of power consumed while processing the probe communication.

9. The method of claim 1, wherein the method further comprises automatically instructing a first server in the set of servers to enter a low power consumption mode when the server consumes more power than other servers in the set of servers and when the server is unlikely to be utilized for a given period of time.

10. The method of claim 9, wherein instructing a first server to enter a low power consumption mode comprises automatically determining that a current time is within a time period associated with low utilization of the servers.

11. The method of claim 9, wherein instructing a first server to enter a low power consumption mode comprises automatically determining that a second server has a utilization rate that is lower than a threshold, wherein the second server is in the set of servers and is associated with a power consumption rating that is lower than a power consumption rating of the first server.

12. The method of claim 1, wherein identifying a type of the network communication comprises identifying a type of request to access a resource provided by the servers.

13. The method of claim 12, wherein identifying a type of request to access a resource comprises identifying a request to access a resource identified by a particular Universal Resource Locator (URL).

14. The method of claim 12, wherein identifying a type of request to access a resource comprises identifying a request to access a computational application executing on the servers.

15. The method of claim 1,
wherein the method further comprises identifying a set of classes of the servers, wherein servers are classified based on amounts of power consumed by the servers;
wherein identifying a server comprises identifying a class in the set of classes wherein servers in the identified class are not over-utilized and wherein the servers in the identified class consume less electrical power to process network communications of the identified type of the network communication than servers in other ones of the classes that are not over-utilized; and
wherein forwarding the network communication comprises selecting a server in the identified class and forwarding the network communication to the selected server.

16. The method of claim 1, wherein identifying a server comprises identifying one of the servers that is not over-utilized that is capable of processing the network communication with a combined level of power consumption and response time to the network communication that is less than combined levels of power consumption to process the network communication and response time to the network communication of other ones of the servers that are not over-utilized.

17. The method of claim 1,
wherein at least one of the servers operates a plurality of virtual machines that provide operating environments for applications; and
wherein the method further comprises redistributing the virtual machines among the servers to reduce overall power consumption of the servers.

18. The method of claim 17, wherein redistributing the virtual machines comprises terminating a lower-priority one of the virtual machines on the server.

19. The method of claim 1,
wherein the set of servers is a first set of servers;
wherein, when servers in the first set of servers process the network communication, the servers send requests to servers in a second set of servers;
wherein a load balancer distributes the requests among the servers in the second set of servers; and
wherein identifying a server comprises:
identifying a server in the set of first servers, wherein when a probe communication is sent to the identified server, servers in the first set of servers and second set of servers consume less power than when the probe communication is sent to any other server in the first set of servers.

20. The method of claim 19, wherein the method further comprises determining, for each server in the set of servers, how much power is typically consumed by servers in the first set of servers and servers in the second set of servers when the probe communication is sent to the server.

21. A network device located on a computer network between a client device and a plurality of servers, the network device comprising:
an interface to receive a network communication from the computer network; and
a server selection module to determine a network application associated with the network communication, to identify a set of the plurality of servers able to process the network communication and, to select a server in the set of servers as a function of a power consumption rate for each of the servers, wherein the power consumption rate specifies an amount of power consumed by the respective server when processing network communications associated with the network application, and to forward the network communication to the selected server; and
a hibernation module to automatically instruct a first server in the set of servers to enter a low power consumption mode when the server consumes more power than other servers in the set of servers and when the server is unlikely to be utilized for a given period of time,
wherein the hibernation module automatically instructs the first server to enter the low power consumption mode when the hibernation module determines that a second server has a utilization rate that is lower than a utilization threshold, wherein the second server is in the set of servers and it is determined that the second server is associated with a power consumption rating that is lower than a power consumption rating of the first server.

22. The network device of claim 21, wherein the server selection module accesses a set of stored power consumption profiles for the servers, wherein each of the power consumption profiles specifies rates of electrical power consumption for respectives ones of the servers at a plurality of levels of granularity and determines the rate of electrical power consumption for the server using the power consumption profile of the server.

23. The network device of claim 21, wherein the network device further comprises a server power module to automatically estimate amounts of power consumed by each of the servers.

24. The network device of claim 23, wherein the server power module automatically estimates amounts of power consumed by receiving a listing of hardware components for each of the servers and obtaining power consumption ratings for each of the listed hardware components.

25. The network device of claim 23, wherein the server power module automatically estimates amounts of power consumed by obtaining measurements regarding power consumption from sensors in the servers.

26. The network device of claim 23, wherein the network device comprises a request power estimation module to estimate power consumption rates of the servers when processing one or more types of requests.

27. The network device of claim 21, wherein the server selection module identifies a type of the network communication by identifying a type of request to access a resource provided by the servers.

28. The network device of claim 21, wherein the server selection module comprises a server classification module to identify a set of classes of the servers, wherein servers are classified based on amounts of power consumed by the servers, and to identify a class in the set of classes wherein servers in the identified class have utilization rates that are not above a utilization threshold for the identified class and wherein the servers in the identified class consume less electrical power to process network communications of the identified type of the network communication than servers in other ones of the classes that are do not have utilization rates that are above a utilization threshold for the other ones of the classes, to select a server in the identified class, and to forward the network communication to the selected server.

29. The network device of claim 21,
wherein at least one of the servers operates a plurality of virtual machines that provide operating environments for applications; and
wherein the network device further comprises a virtual machine configuration module to redistribute the virtual machines among the servers to reduce overall power consumption of the servers.

30. The network device of claim 21,
wherein the set of servers is a first set of servers;
wherein, when servers in the first set of servers process the network communication, the servers send requests to servers in a second set of servers;
wherein a load balancer distributes the requests among the servers in the second set of servers; and
wherein the network device further comprises a heuristic analysis module to identify a server in the set of first servers, wherein when a probe communication is sent to the identified server, servers in the first set of servers and second set of servers consume less power than when the probe communication is sent to any other server in the first set of servers.

31. A system comprising:
a client device;
a plurality of servers;
a network device; and
a network to facilitate communication between the servers and the network device,
wherein the network device comprises:
an interface to receive a network communication from the client device;
a server selection module to determine a network application associated with the network communication, to identify a set of the plurality of servers able to process the network communication and, to select a server in the set of servers as a function of a power consumption rate for each of the servers, wherein the power consumption rate specifies an amount of power consumed by the respective server when processing network communications associated with the network application, and to forward the network communication to the selected server; and
a hibernation module to automatically instruct a first server in the set of servers to enter a low power consumption mode when the server consumes more power than other servers in the set of servers and when the server is unlikely to be utilized for a given period of time,
wherein the hibernation module automatically instructs the first server to enter the low power consumption mode when the hibernation module determines that a second server has a utilization rate that is lower than a utilization threshold, wherein the second server is in the set of servers and it is determined that the second server is associated with a power consumption rating that is lower than a power consumption rating of the first server.

32. A non-transitory computer-readable medium comprising instructions, the instructions causing a programmable processor to:
receive, with an intermediate network device, a network communication from a computer network, wherein the intermediate network device is located between a client device and a plurality of servers;
determine a network application associated with the network communication;
identify a set of the plurality of servers able to process the network communication;
access a set of stored power consumption profiles for the servers, wherein each of the power consumption profiles specifies rates of electrical power consumption for the respective server at a plurality of levels of granularity, wherein for each power consumption profile the levels of granularity specify a first level that specifies an average power consumption rate for the server, a second level that specifies power consumption rates for the server with respect to a plurality of different types of network applications, and a third level that specifies power consumption rates for the server with respect to a plurality of individual network resources for each of the different types of network applications;
using the power consumption profile of the servers, determine the rate of electrical power consumption for each the servers when processing network communications associated with the network application, select one of the servers as a function of the determined power consumption rate for each of the servers, forward the network communication to the selected server.

33. A computer-implemented method comprising:

receiving, with an intermediate network device, a network communication from a computer network, wherein the intermediate network device is located between a client device and a plurality of servers;

determining a network application associated with the network communication;

identifying a set of the plurality of servers able to process the network communication;

selecting a server in the set of servers as a function of a power consumption rate for each of the servers, wherein the power consumption rate specifies an amount of power consumed by the respective server when processing network communications associated with the network application; and forwarding the network communication to the selected server, wherein the method further comprises automatically instructing a first server in the set of servers to enter a low power consumption mode when the server consumes more power than other servers in the set of servers and when the server is unlikely to be utilized for a given period of time, wherein instructing a first server to enter a low power consumption mode comprises automatically determining that a second server has a utilization rate that is lower than a threshold, and wherein the second server is in the set of servers and is associated with a power consumption rating that is lower than a power consumption rating of the first server.

34. A computer-implemented method comprising:

receiving, with an intermediate network device, a network communication from a computer network, wherein the intermediate network device is located between a client device and a plurality of servers;

determining a network application associated with the network communication;

identifying a set of the plurality of servers able to process the network communication;

selecting a server in the set of servers as a function of a power consumption rate for each of the servers, wherein the power consumption rate specifies an amount of power consumed by the respective server when processing network communications associated with the network application; and forwarding the network communication to the selected server, wherein the method further comprises identifying a set of classes of the servers, wherein servers are classified based on amounts of power consumed by the servers, wherein identifying a server comprises identifying a class in the set of classes, wherein servers in the identified class are not over-utilized and wherein the servers in the identified class consume less electrical power to process network communications of the identified type of the network communication than servers in other ones of the classes that are not over-utilized, and wherein forwarding the network communication comprises selecting a server in the identified class and forwarding the network communication to the selected server.

35. A computer-implemented method comprising:

receiving, with an intermediate network device, a network communication from a computer network, wherein the intermediate network device is located between a client device and a plurality of servers, wherein at least one of the servers operates a plurality of virtual machines that provide operating environments for applications;

determining a network application associated with the network communication;

identifying a set of the plurality of servers able to process the network communication;

selecting a server in the set of servers as a function of a power consumption rate for each of the servers, wherein the power consumption rate specifies an amount of power consumed by the respective server when processing network communications associated with the network application;

forwarding the network communication to the selected server; and redistributing the virtual machines among the servers to reduce overall power consumption of the servers by terminating a lower-priority one of the virtual machines on the server.

36. A computer-implemented method comprising:

receiving, with an intermediate network device, a network communication from a computer network, wherein the intermediate network device is located between a client device and a plurality of servers;

determining a network application associated with the network communication;

identifying a first set of the servers that are able to process the network communication, wherein, when processing the network communication, the first set of servers send requests that are distributed among a second set of servers by a load balancer;

sending probe communications to the first set of servers;

selecting a server in the first set of servers as a function of a power consumption rate for each of the servers, wherein the power consumption rate specifies an amount of power consumed by the respective server when processing the probe communication, and wherein when a probe communication is sent to the selected server, servers in the first set of servers and second set of servers consume less power than when the probe communication is sent to any other server in the first set of servers; and forwarding the network communication to the selected server.

37. A network device located on a computer network between a client device and a plurality of servers, the network device comprising:

an interface to receive a network communication from the computer network; and a server selection module to determine a network application associated with the network communication, to identify a set of the plurality of servers able to process the network communication and, to select a server in the set of servers as a function of a power consumption rate for each of the servers, wherein the power consumption rate specifies an amount of power consumed by the respective server when processing network communications associated with the network application, and to forward the network communication to the selected server, wherein the server selection module comprises a server classification module to identify a set of classes of the servers, wherein servers are classified based on amounts of power consumed by the servers, and to identify a class in the set of classes wherein servers in the identified class have utilization rates that are not above a utilization threshold for the identified class, and wherein the servers in the identified class consume less electrical power to process network communications of the identified type of the network communication than servers in other ones of the classes that are do not have utilization rates that are above a utilization threshold for the other ones of the classes, to select a server in the identified class, and to forward the network communication to the selected server.

38. A network device located on a computer network between a client device and a plurality of servers, the network device comprising:

an interface to receive a network communication from the computer network; and a server selection module to determine a network application associated with the network communication, to identify a first set of the plurality of servers able to process the network communication by sending requests that are distributed to a second set of servers by a load balancer, wherein the service selection module is configured to select a server in the first set of servers as a function of a power consumption rate for each of the servers, wherein the power consumption rate specifies an amount of power consumed by the respective server when processing network communications associated with the network application, and to forward the network communication to the selected server, wherein the service selection module selects the server that, when a probe communication is sent to the server, servers in the first set of servers and second set of servers consume less power than when the probe communication is sent to any other server in the first set of servers.

* * * * *